(12) United States Patent
Ahrendt et al.

(10) Patent No.: US 6,211,665 B1
(45) Date of Patent: Apr. 3, 2001

(54) SOLENOID MOTION DETECTION CIRCUIT

(75) Inventors: Terry J. Ahrendt, Mesa; Stephen G. Abel, Chandler, both of AZ (US)

(73) Assignee: AlliedSignal Inc., Morris Township, NJ (US)

( * ) Notice: Subject to any disclaimer, the term of this patent is extended or adjusted under 35 U.S.C. 154(b) by 0 days.

(21) Appl. No.: 09/290,275

(22) Filed: Apr. 13, 1999

(51) Int. Cl.⁷ ...................................................... G01B 7/14
(52) U.S. Cl. .................. 324/207.16; 324/207.24
(58) Field of Search .................. 324/207.16, 207.24, 324/207.26, 226, 654; 137/554; 361/152, 160, 170, 187; 251/129.15

(56) References Cited

U.S. PATENT DOCUMENTS

| | | | |
|---|---|---|---|
| 3,789,876 | 2/1974 | Kempton et al. | 137/554 |
| 4,321,946 | 3/1982 | Paulos et al. | 137/554 |
| 4,692,678 | 9/1987 | Lee | 318/687 |
| 4,907,901 | 3/1990 | Mitchell | 400/157.2 |
| 5,424,637 | 6/1995 | Oudyn et al. | 324/207.16 |
| 5,481,187 | 1/1996 | Marcott et al. | 324/207.16 |
| 5,578,904 | 11/1996 | Marcott et al. | 324/207.16 |
| 5,583,434 | 12/1996 | Moyers et al. | 324/207.16 |
| 5,600,237 | 2/1997 | Nippert | 324/207.16 |

*Primary Examiner*—Jay Patidar
(74) *Attorney, Agent, or Firm*—Keith Newbury, Esq.

(57) ABSTRACT

A circuit arrangement is described which detects when the moving member of an electromagnetic device is in motion by detecting coincidence of energization of the device coil and a negative first differential of the current/time waveform and a positive first differential of the voltage/time waveform through said coil.

13 Claims, 1 Drawing Sheet

SOLENOID MOTION DETECTION CIRCUIT

TECHNICAL FIELD

This invention pertains to monitoring and control apparatus, in general, and to a method and apparatus for indicating movement of a moveable member of an electromagnetic device, in particular.

BACKGROUND OF THE INVENTION

Electromagnetic devices such as solenoid devices are in widespread use. In certain applications, there is a need to perform test and fault detection on solenoid operators. In many of these applications, the solenoid device is disposed at a remote location or is otherwise inaccessible. Prior art has attempted to solve this challenge but has been limited to voltage-drive applications (U.S. Pat. No. 4,321,946 "Armature Position Monitoring and Control Device" and U.S. Pat. No. 4,907,901 "Method and Apparatus for Measuring Displacement of a moveable Member of an Electromagnetic Device by Using Perturbations in the Device's Energizing Current") or has required separate and added sensors (U.S. Pat. No. 3,789,876 "Solenoid Valve with Electronic Position Indicator" and U.S. Pat. No. 4,692,678 "Closed Loop Servo Control System").

High response solenoids using current drive controllers require more sophisticated circuitry, in order to capture armature motion, that is not provided in the prior art. The invention herein described solves these problems.

SUMMARY OF THE INVENTION

In accordance with the invention, a circuit for detecting motion of an electromagnetic device is provided. The electromagnetic device includes coil and a movable member. The circuit detects coincidence of energization of the device coil and reverse rates of change of the coil current and voltage waveforms. These are indicated by monitoring the first differentials of the coil current and voltage versus time waveforms. The differentiated signals are compared to thresholds in order to screen out circuit noise. The circuit also includes delay and one-shot timer networks to create valid timing windows. The comparator and valid window signals are then ANDed to produce event signals from the current and voltage paths. These two event signals are then ORed together and routed through a flip-flop device. When either a current or voltage event occurs, the flip-flop output is toggled. The flip-flop is reset each time power is applied to the solenoid.

When the armature moves, either the current path or the voltage path will signal the motion detected event. If motion occurs before current limit is achieved, the current path detects the event. If motion occurs after current limit is achieved, then the voltage path detects the event. The current and voltage waveforms are subjected to reverse slopes because of the back-EMF (electro-motive-force) generated by the armature moving within the magnet field of the solenoid.

BRIEF DESCRIPTION OF THE DRAWING

The sole FIGURE shows a solenoid circuit contemplated by the present invention.

DETAILED DESCRIPTION

Figure 1:
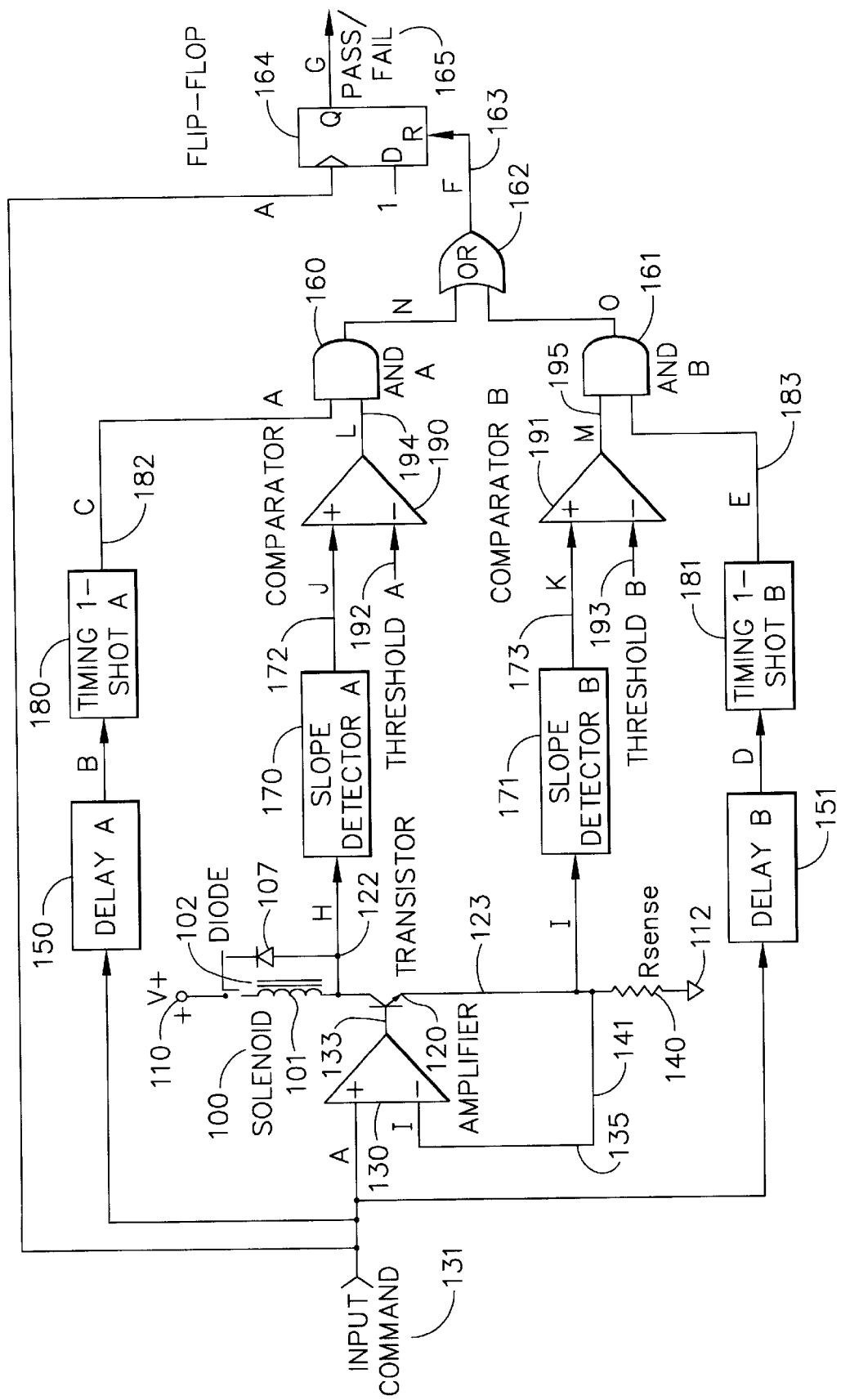

The circuit shown in the drawing illustrates an electromagnetic device in conjunction with a drive circuit and a motion detection circuit. The electromagnetic device is a solenoid 100. Solenoid 100 is of a conventional design and includes a coil 101 and a moveable member or armature 102. Solenoid 100 is typically incorporated into a device which utilizes the movement or position of the armature to perform or indicate some specific function. As is conventional with solenoid circuits, a diode 107 is connected in parallel with the solenoid coil 101 to protect the connected circuitry from so-called "flyback" voltages when it is switched off.

Solenoid 100 receives power from a power source which is indicated by the power terminals 110, 112. A current drive controller 130 is utilized in conjunction with transistor switch 120 to provide power to the solenoid 100. The transistor switch 120 is shown as a bipolar device, in the illustrative embodiment, but may be of another type of electronic switch. Transistor switch 120 includes a control terminal 133, and switched path terminals 122 and 123. Transistor switch 120 responds to signals at its control terminal 133 to establish a conductive path between terminals 122 and 123.

Current drive controller 130 is utilized to control operation of solenoid 100. Controller 130 is of a current limiting design which is known to those skilled in the art and includes a command input terminal 131, a feedback input terminal 135 and an output (power terminals are not shown) which is connected to control terminal of switch 120. A current sensing resistor 140 is coupled between terminal 123 of switch 120 and the power supply return terminal 112. A feedback path 141 is connected between sensing resistor 140 and feedback input terminal 135 of controller 130. Sensing resistor 140 provides a current feedback signal to terminal 135 via feedback path 141.

A delay circuit 150 has an input coupled to the command signal 131, which also drives controller 130. The delay output signal is in turn coupled to a one-shot timing circuit 180. When triggered, output 182 of the timer switches true for a predetermined amount of time. This logic signal is used in conjunction with the processed voltage signal, as described below, when coupled to one input of a two input coincidence circuit which is provided by logic AND gate 160. A similar circuit comprised of delay 151, one-shot timer 181, output 183 and AND gate 161, is provided to be used in conjunction with the processed current signal. Separate timing window signals 182 and 183 are generated so that independent delays and pulse widths can be incorporated.

A slope detector circuit 170 is coupled to the solenoid low side terminal 122 and provides an output signal 172 when it detects a positive slope in the voltage signal. The slope detector circuit 170 is comprised of a differentiator and a low pass filter. Output 172 is routed through a comparator 190 and compared to threshold 192 in order to reject erroneous noise signals. Comparator output 194 is coupled to the second input of AND gate 160. In operation, when the slope detector circuit 170 detects a positive slope of the voltage waveform and the delay and timing circuit 150 and 180 detects that the solenoid has been energized, the AND gate 160 provides an output indication that the solenoid armature has moved.

A second slope detector circuit 171 is coupled to the circuit sensing resistor 140 and provides an output signal when it detects a negative slope in the solenoid current signal provided to terminal 135. The slope detector circuit 171 is comprised of a differentiator and a low pass filter. Output 173 is routed through a comparator 191 and compared to threshold 193 in order to reject erroneous noise signals. Comparator output 195 is coupled to the second input of AND gate 161. In operation, when the slope detector circuit 171 detects a negative slope and the delay and timing circuit 151 and 181 detects that the solenoid has been energized, the AND gate 161 provides an output indication that the solenoid armature has moved.

When an electromagnetic device without moving parts is energized with a constant voltage the change in current with respect to time is an increasing logarithmic curve. Where there is movement of an armature within the magnetic field, perturbations occur in the waveform. If this motion occurs before the current has reached the limit as set by the fixed current command, then a perturbation of the current waveform results. By taking the first derivative of the current waveform a change in current with respect to time can be observed. The first derivative will appear as a negative slope with movement of the energized solenoid armature. If the movement of the armature occurs after the current has achieved the limit, a perturbation in the applied solenoid voltage occurs. By taking the first derivative of the voltage waveform, a change in voltage with respect to time can be observed. The first derivative will appear as a positive slope coincident with solenoid armature movement. The circuit of the present invention makes advantageous use of both of these waveform perturbations in order to detect that the armature has moved.

Since only one of the above circuits will detect motion, given variations in coil temperature, supply voltage and solenoid loading, the outputs of AND gates 160 and 161 are combined with OR gate 162. The resulting OR gate output 163 forms a motion detected signal valid for all prevailing conditions. This signal is finally applied to flip-flop device 164. This device is reset every time that command 131 is cycled. In this manner, flip-flop output 165 toggles each time the armature moves following an energize command. This pass/fail output is then monitored by the user of the solenoid and circuit system.

The invention has been described in terms of a specific embodiment. It will be understood by those skilled in the art that various modifications and changes may be made to the illustrative embodiment without departing from the spirit or scope of the invention. It is intended that the scope of the invention cover all such changes and modifications. It is further intended that the invention be limited in scope only by the claims appended hereto.

What is claimed is:

1. Apparatus for detecting movement of a movable member, comprising:
   an electromagnetic device comprising said movable member and an associated operating coil;
   a circuit coupled to said operating coil for energizing said coil to move said movable member, said circuit including means for sensing current flow through said coil; and
   a motion detecting circuit coupled to said circuit and to said sensing means for current or voltage slope reversals through said coil with respect to time coincident with said operating coil being energized and for providing an output signal when said circuit indicates said coincidence.

2. Apparatus in accordance with claim 1, wherein:
   said motion detecting circuit comprises a first circuit for detecting application of power to said coil and a second circuit for detecting differential current and voltage slopes with respect to time.

3. Apparatus in accordance with claim 2, wherein:
   said motion detecting circuit includes a coincidence circuit for combining outputs of said first and second circuits to generate said output signal.

4. Apparatus in accordance with claim 3, wherein:
   said coincidence circuit comprises an AND gate for combining the outputs of said first and second circuits.

5. Apparatus in accordance with claim 4, wherein:
   said coincidence circuit includes a monostable multivibrator circuit having a trigger input coupled to said AND gate output for generating said output signal.

6. Apparatus for detecting movement of a solenoid armature, comprising:
   a solenoid comprising the solenoid armature and an associated operating coil;
   a circuit coupled to said operating coil for energizing said coil to move the solenoid armature, said including means for sensing current flow through said coil; and
   a motion detecting circuit coupled to said circuit and to said sensing means for current or voltage slope reversals through said coil with respect to time coincident with said operating coil being energized and for providing an output signal when said circuit indicates said coincidence.

7. Apparatus in accordance with claim 6, wherein:
   said detecting circuit comprises a first circuit for detecting application of power to said coil and a second circuit for detecting current and voltage slope changes with respect to time.

8. Apparatus in accordance with claim 7, wherein:
   said detecting circuit includes a coincidence circuit receiving outputs of said first and second circuits to generate said output signal.

9. Apparatus in accordance with claim 8, wherein:
   said coincidence circuit comprises an AND gate for combining the outputs of said first and second circuits.

10. Apparatus in accordance with claim 9, wherein:
    said coincidence circuit includes a monostable multivibrator circuit, or one-shot timer, having a trigger input coupled to said AND gate output for generating said output signal.

11. A method of determining movement of a moveable member of an electromagnetic device having a switched circuit for providing power to a coil of said device and a current sensing element, said method comprising the steps of:
    energizing said operating coil;
    sensing current flow through and terminal voltage of said operating coil;
    detecting a first differential of current and voltage through said coil with respect to time coincident with said operating coil being energized; and
    providing an output signal when said circuit indicates said coincidence.

12. A method in accordance with claim 11, wherein:
    said device is a solenoid, and said moveable member is an armature.

13. Apparatus comprising:
    a solenoid comprising a coil and a moveable armature;
    a control circuit connected to said solenoid for controlling operation thereof, said control circuit including said coil connected to a first power supply terminal, an electronic switch coupled between one end of said coil and a second power supply terminal, current sensing means disposed between said other end and said second power supply terminal, a current control circuit having a first control output coupled to said electronic switch to cause electronic switch to change between first and second conductive states; and a motion detection circuit comprising: two detector circuits coupled one to each electronic switch output to determine that said solenoid has been energized, each having a slope detector circuit for detecting changes in current or voltage slopes of said solenoid, and a coincidence circuit coupled to said detector circuits and said slope detector circuits and generating a signal indicating that said armature is in motion upon detecting the coincidence of said solenoid being energized and detection of changes in the signal slopes.

* * * * *